(12) United States Patent
Oxford

(10) Patent No.: US 9,842,212 B2
(45) Date of Patent: Dec. 12, 2017

(54) SYSTEM AND METHOD FOR A RENEWABLE SECURE BOOT

(71) Applicant: Rubicon Labs, Inc., San Francisco, CA (US)

(72) Inventor: William V. Oxford, Austin, TX (US)

(73) Assignee: Rubicon Labs, Inc., San Francisco, CA (US)

( * ) Notice: Subject to any disclaimer, the term of this patent is extended or adjusted under 35 U.S.C. 154(b) by 70 days.

(21) Appl. No.: 14/930,864

(22) Filed: Nov. 3, 2015

(65) Prior Publication Data

US 2016/0125187 A1  May 5, 2016

Related U.S. Application Data

(60) Provisional application No. 62/074,376, filed on Nov. 3, 2014.

(51) Int. Cl.
| | | |
|---|---|---|
| *H04L 9/00* | (2006.01) | |
| *G06F 21/57* | (2013.01) | |
| *H04L 29/06* | (2006.01) | |
| *G06F 21/10* | (2013.01) | |

(52) U.S. Cl.
CPC .......... *G06F 21/575* (2013.01); *G06F 21/105* (2013.01); *G06F 21/572* (2013.01); *H04L 63/0442* (2013.01); *H04L 63/123* (2013.01); *G06F 2221/0704* (2013.01); *G06F 2221/0724* (2013.01)

(58) Field of Classification Search
CPC ...... G06F 21/57; G06F 21/572; G06F 21/575; G06F 21/105; H04L 63/0442; H04L 63/123; H04L 63/083

USPC ...... 713/164, 168, 170, 181, 189, 2; 380/44; 705/51, 59
See application file for complete search history.

(56) References Cited

U.S. PATENT DOCUMENTS

| | | | |
|---|---|---|---|
| 7,299,354 B2 * | 11/2007 | Khanna ................ | G06F 21/575 |
| | | | 380/278 |
| 7,328,335 B1 | 2/2008 | Sundararajan et al. | |
| 7,376,968 B2 * | 5/2008 | Ritz ....................... | G06F 21/575 |
| | | | 713/2 |
| 8,201,240 B2 * | 6/2012 | Tarkkala ................ | G06F 21/51 |
| | | | 713/2 |

(Continued)

OTHER PUBLICATIONS

International Search Report and Written Opinion issued for PCT Application No. PCT/US2015/058726, dated May 17, 2016, 9 pages.

(Continued)

*Primary Examiner* — Hosuk Song
(74) *Attorney, Agent, or Firm* — Sprinkle IP Law Group

(57) ABSTRACT

Embodiments of systems and methods disclosed herein include renewable secure boot systems for renewing and booting a target device. Systems and methods include techniques by which a secure boot may be implemented in a renewable fashion on a reprogrammable device. More specifically, in certain embodiments, systems and methods are described where target devices securely receive an encrypted boot image and one or more authorization codes from a third party. The one or more authorization codes are derivatives of a target device hardware secret, allowing the authorization codes to be changed at will, thus increasing flexibility and security of the system.

20 Claims, 11 Drawing Sheets

(56) References Cited

U.S. PATENT DOCUMENTS

| | | | |
|---|---|---|---|
| 8,214,632 B2 * | 7/2012 | Choi | G06F 21/575 380/44 |
| 8,443,204 B2 * | 5/2013 | Hauck | G06F 21/572 713/187 |
| 8,566,574 B2 * | 10/2013 | Shriver | G06F 21/575 713/189 |
| 8,656,146 B2 * | 2/2014 | Findeisen | G06F 21/575 370/351 |
| 2005/0071677 A1 | 3/2005 | Khanna et al. | |
| 2005/0079868 A1 | 4/2005 | Shankar et al. | |

OTHER PUBLICATIONS

International Preliminary Report on Patentability issued for PCT Application No. PCT/US2015/058726, dated May 18, 2017, 8 pages.

* cited by examiner

SYSTEM AND METHOD FOR A RENEWABLE SECURE BOOT

RELATED APPLICATIONS

This application claims a benefit of priority under 35 U.S.C. §119 to United States Provisional Patent Application No. 62/074,376 filed Nov. 3, 2014, entitled "SYSTEM AND METHOD FOR A RENEWABLE SECURE BOOT", by William V. Oxford, which is hereby fully incorporated by reference in its entirety.

TECHNICAL FIELD

This disclosure relates in general to security in computer systems. In particular, this disclosure relates to systems and methods for a renewable secure boot for a processor.

BACKGROUND

Secure boot systems, even secure boot systems on reprogrammable devices, typically boot up into a secure mode that does not easily allow for renewing the secure boot code. For example, some systems employ a one-time programmable boot code that is burned into the chip. To renew the boot code, the entire chip must be replaced.

Other systems may employ a fixed secure boot loader, which may then call a renewable boot routine, but such a renewable boot process can be insecure. For example, in such cases, it may be possible to remove the updated boot code and replace it with the previous version boot code (which ostensibly has bugs that may be exploited by an attacker) and thus gain access to the system.

Thus, it is desirable to have a method by which a secure boot may be implemented in a renewable fashion on a reprogrammable device.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

SUMMARY OF THE DISCLOSURE

Embodiments of systems and methods for providing a renewable secure boot for a processor that enable rapid and easy renewal of the secure boot code and that are secure from replay attacks are disclosed.

In particular, in one embodiment, methods of securely renewing and booting a target device include receiving an encrypted boot image and one or more authorization codes from a third party. The target device is able to decrypt the encrypted boot image using an updatable key that is derived from an embedded device secret. The target device may also receive an authorization code that can be used by the target device to change the underlying secret used for authentication and encryption or to authenticate the received secure boot image. This authorization code may be public, but derived from an embedded device secret. To authenticate a received secure boot image, the target device may generate a message authentication code (MAC) using the secure boot image and a key derived from an embedded device secret. Once a comparison of the received authorization code and the generated MAC confirms a match, the decrypted boot image can be used to securely boot the target device.

In other embodiments, methods allow two exemplary basic options including a "persistent" option and a "provisioned" option. Embodiments enabling a persistent option are similar to a one-time programmable system in which a secure boot loader is burned into the One-Time-Programmable (OTP) storage on the chip itself. Unlike standard OTP systems, however, the embodiments described herein provide for true renewability by updating the system with a new secure boot image, while permanently disabling previous secure boot images on a target device without requiring the OTP value to be updated or modified.

Embodiments enabling a provisioned option can prevent a system booting into secure mode until it communicates with an external service. This option can be used to force a target device to download and use the most recent secure boot code, no matter what version it has been running in the past. Note that, once the device has finished the secure boot process, it can operate independently of the service for as long as policy dictates. Also note that these two options can be combined to create a hybrid form.

In other embodiments, secure systems can be implemented using various configurations of hardware and software. For the hardware components, conventional CPU(s) may be used. Alternatively, or in addition, one or more FPGA (field programmable gate array) devices may be used. For embodiments implemented using an FPGA, embodiments enable secure and efficient updating of FPGA configuration files.

Additionally, embodiments of systems are presented which embody these types of methodologies in computer systems, hardware, and software. It should be noted that the same hardware implementation could potentially be used to implement any one or combination of the entire range of solutions, depending on the requirements of the software.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As will be discussed in greater detail below, embodiments are provided for a renewable secure boot system that can be updated remotely, using a recursive security authentication mechanism. Two exemplary basic options are discussed: a "persistent" option and a "provisioned" option.

The "persistent" option is similar to a one-time programmable system in which a secure boot loader is burned into One-Time-Programmable (OTP) storage on the chip itself. Unlike standard OTP systems, however, the mechanism described herein provides for true renewability. In other words, if a system is updated with a new secure boot image, then the deprecated secure boot image will be permanently disabled for the target device. This is described as "persistent", since this capability can be retained over reset or power-cycles (as long as the ACT_Secret value is maintained, as described below) and this functionality is accomplished with only a single communication between the target device and the service.

In the "provisioned" option, the system cannot boot into secure mode until it communicates with an external service. This option can be used to force a target device to download and use the most recent secure boot code, no matter what version it has been running in the past. Note that, once the device has finished the secure boot process, it can operate independently of the service for as long as policy dictates. Also note that these two options can be combined to create a hybrid form. For example, the boot loader may be persistent but the secure boot code portion itself may be externally provisioned.

Figure 1:
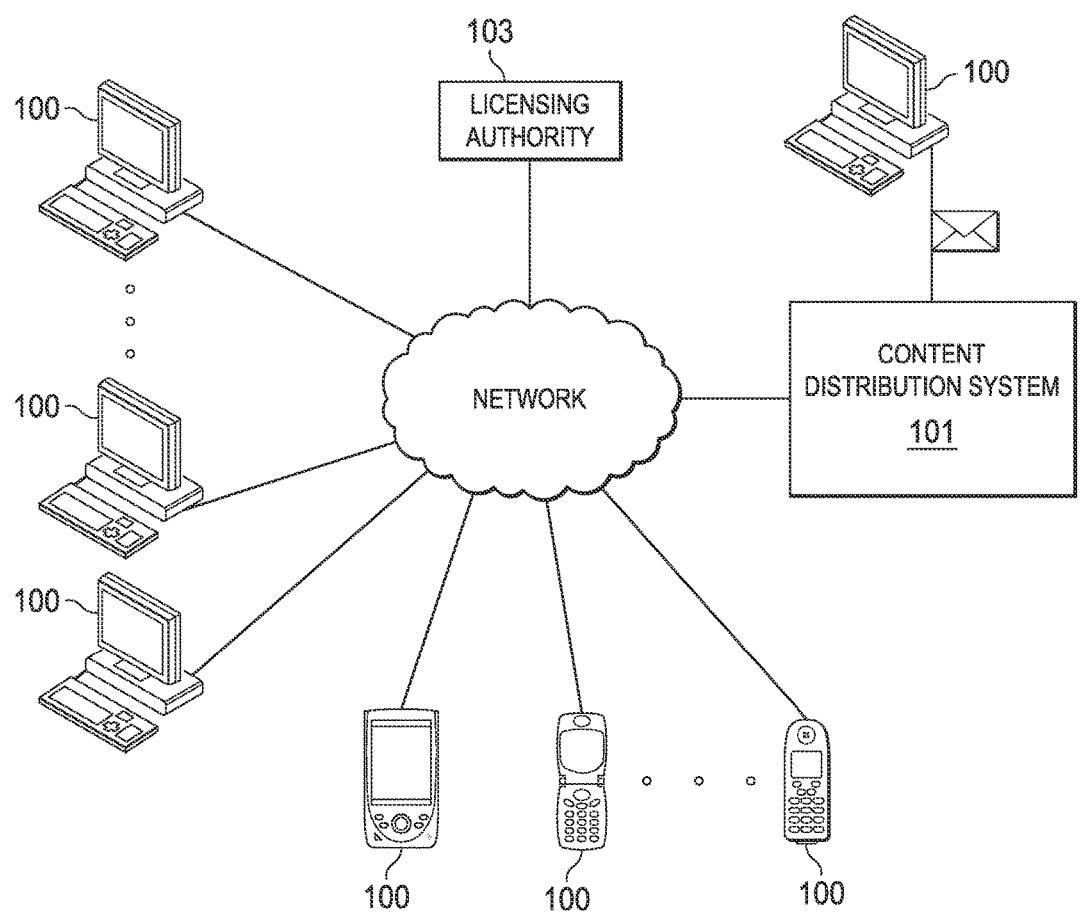
FIG. 1 depicts one embodiment of an architecture for content distribution.

Before discussing embodiments in more detail, it may helpful to give a general overview of an architecture in which embodiments of the present invention may be effectively utilized. FIG. 1 depicts one embodiment of such a topology. Here, a content distribution system 101 may operate to distribute digital content (which may be for example, a bitstream comprising audio or video data, a software application, etc.) to one or more target units 100 (also referred to herein as target or endpoint devices) which comprise protocol engines. These target units may be part of, for example, computing devices on a wireline or wireless network or a computer device which is not networked, such computing devices including, for example, personal computers, cellular phones, personal data assistants, media players which may use content delivered as a bitstream over a network or on a computer readable storage media that may be delivered, for example, through the mail, etc. This digital content may compose or be distributed in such a manner such that control over the execution of the digital content may be controlled and security implemented with respect to the digital content.

In certain embodiments, control over the digital content may be exercised in conjunction with a licensing authority 103. This licensing authority 103 (which may be referred to as a central licensing authority, though it will be understood that such a licensing authority need not be centralized and whose function may be distributed, or whose function may be accomplished by content distribution system 101, manual distribution of data on a hardware device such as a memory stick, etc.) may provide a key or authorization code. This key may be a compound key (e.g., a key that is at least partially-derived from one or more embedded device secrets), that is both cryptographically dependent on the digital content distributed to the target device as well as being bound to the target device (or the device's embedded secret). In one example, a target device may be attempting to execute an application in secure mode. This secure application (which may be referred to as candidate code or a candidate code block may be used in order to access certain digital content.

Accordingly, to enable a candidate code block to run in secure mode on the processor of a particular target device 100 to which the candidate code block is distributed, the licensing authority 103 must supply a correct value of a compound key (one example of which may be referred to as an Authorization Code or AuthCode) to the target device on which the candidate code block is attempting to execute in secure mode. No other target device (e.g., a target device that does not have the same embedded device secret) can run the candidate code block correctly with the compound key and no other compound key will work correctly with the candidate code block on that particular target device.

As will be described in more detail later on herein, when Target Device 100 loads the candidate code block into its instruction cache (and, for example, if CC1 is identified as the code block that is intended to be executed in secure mode), the target device 100 (e.g., TD1) engages a hash function (which may be hardware based) that creates a message digest (e.g., MD1) of that candidate code block (e.g., CC1). The seed value for this hash function is the embedded secret key for the target device 100 (e.g., TD1's embedded secret key (e.g., SK1)).

In fact, such a message digest (e.g., MD1) may be considered as a standard Message Authentication Code (MAC) as well as a compound key, since the hash function result depends on the seed value of the hash (e.g., the code block CC1), the embedded secret key of the target device 100 (e.g., SK1). Thus, the resulting value of the message digest (MD1) is cryptographically bound to both the embedded secret key of the target device 100 and to the candidate code block. If the licensing authority-distributed compound key (e.g., DS1) matches the value of the message digest (e.g., MD1), then it can be assured that the candidate code block (e.g., CC1) is both unaltered as well as authorized to run in secure mode on the target device 100 (e.g., TD1). The target device 100 can then run the candidate code block in secure mode.

As can be seen then, in one embodiment, when secure mode execution for a target device 100 is performed, the target device 100 may be executing code that has both been verified as unaltered from its original form, and is cryptographically "bound" to the target device 100 on which it is executing. This method of ensuring secure mode execution of a target device may be contrasted with other systems, where a processor enters secure mode upon hardware reset and then may execute in a hypervisor mode or the like in order to establish a root-of-trust.

Accordingly, using embodiments as disclosed, any or all of these data such as the compound key from the licensing authority, the message digest, the candidate code block, etc. (e.g., DS1, MD1, CC1) may be completely public as longs as the embedded secret key for the target device 100 (e.g. SK1) is not exposed. Thus, it is desired that the value of the secret key of a target device is never exposed, either directly or indirectly. Accordingly, as discussed above, embodiments of the systems and methods presented herein, may, in addition to protecting the embedded secret key from direct exposure, protect against indirect exposure of this secret key, as well as other similarly sensitive data such as the partial results of currently executing secure operations, on target devices 100 by securing the working sets of processes executing in secure mode on target devices 100.

Figure 2:
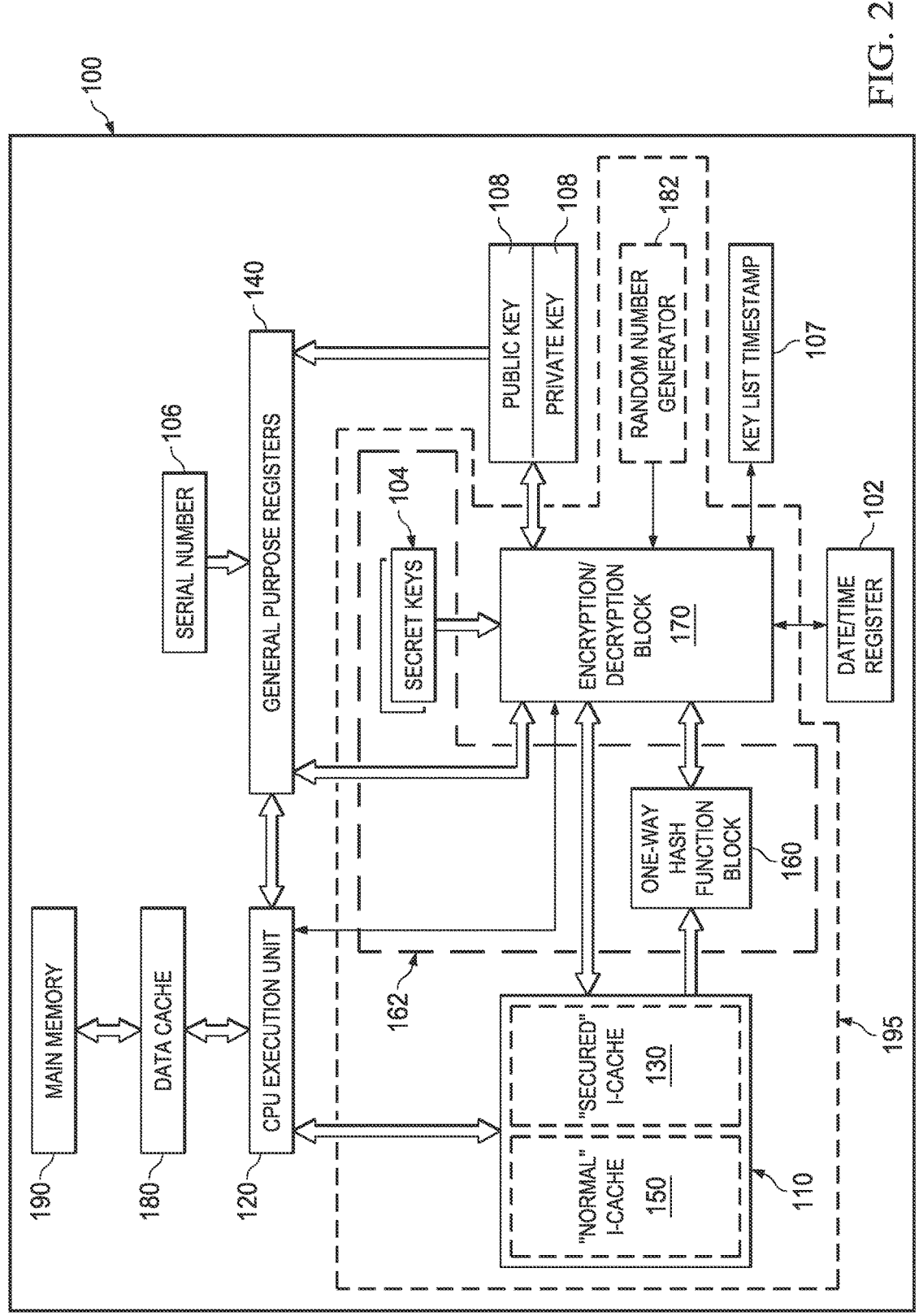
FIG. 2 depicts one embodiment of a target device.

Moving now to FIG. 2, an architecture of one embodiment of a target device that is capable of controlling the execution of the digital content or implementing security protocols in conjunction with received digital content. Elements of the target unit may include a set of blocks, which allow a process to execute in a secured mode on the target device such that when a process is executing in secured mode the working set of the process may be isolated. It will be noted that while these blocks are described as hardware in this embodiment, software may be utilized to accomplish similar functionality with equal efficacy. It will also be noted that while certain embodiments may include all the blocks described herein other embodiments may utilize lesser or additional blocks.

The target device 100 may comprise a CPU execution unit 120 which may be a processor core with an execution unit and instruction pipeline. Clock or date/time register 102 may be a free-running timer that is capable of being set or reset by a secure interaction with a central server. Since the time may be established by conducting a query of a secure time standard, it may be convenient to have this function be on-chip. Another example of such a date/time register may be a register whose value does not necessarily increment in a monotonic manner, but whose value does not repeat. This kind of functionality could be incremented using a Linear Feedback Shift Register (LFSR). Such a register could be useful in the case where a unique timestamp value might be required for a particular reason, but that timestamp value could not necessarily be predicted ahead of time. Thus, a pseudo-random number generator may be a suitable mechanism for implementing such a register. Another option for implementing such a function would be to use the output of a hardware hash function 160 to produce the current value of this register. In the case where the output of such a hash function is used as a seed or salt value for the input of the hash function, the resulting output series may resemble a random number sequence statistically, but the values may nonetheless be deterministic, and thus, potentially predictable, unless a keyed hash function (such as an HMAC) is used. In that case, the output value may be unpredictable unless the value of the key input is also known.

Target unit 100 may also contain a true random number generator 182 which may be configured to produce a sequence of sufficiently random numbers or which can then be used to supply seed values for a pseudo-random number generation system. This pseudo-random number generator can also potentially be implemented in hardware, software or in "secure" software.

A hardware-based one-way hash function block 160 may be used for implementing any of the hash functions required by this protocol. One-way hash function block 160 may be implemented as a part of a secure execution controller 162 that may, in turn, be used to control the placement of the target device 100 in secure mode or that maybe used to control memory accesses (e.g., when the target device 100 is executing in secured mode), as will be described in more detail herein at a later point.

Another portion of the target unit 100 may be a hardware encryption/decryption block 170 (which may be referred to as the encryption system or block, the decryption system or block or the encryption/decryption block interchangeably). This block may use either the target unit's 100 secret key(s) or public/private keys (described later) or a hash-function derivative thereof, as described earlier. This encryption/decryption block 170 can be implemented in a number of ways. It should also be noted that such a combination of a one-way hash function and an encryption/decryption system may comprise a digital signature generator that can be used for the validation of any digital data, whether that data is distributed in encrypted or in plaintext form. The speed and the security of the entire protocol may vary depending on the construction of this block, so it may be configured to be both flexible enough to accommodate security system updates as well as fast enough to allow the system to perform real-time decryption of time-critical messages.

It is not material to embodiments exactly which encryption algorithm is used for this hardware block 170. In order to promote the maximum flexibility, it is assumed that the actual hardware is general-purpose enough to be used in a non-algorithmically specific manner, but there are many different means by which this mechanism can be implemented. It should be noted at this point that, in the case of a symmetric encryption system where the encryption and decryption keys are the same, the terms encryption and decryption may be utilized interchangeably herein when referring to engines (algorithms, hardware, software, etc.) for performing these operations. As will be realized if symmetric encryption is used in certain embodiments, the same or similar encryption or decryption engine may be utilized for both encryption and decryption. In the case of an asymmetric mechanism, the encryption and decryption functions may or may not be substantially similar, even though the encryption and decryption keys will be different.

Target device 100 may also include a data cache 180, an instruction cache 110 where code that is to be executed can be stored, and main memory 190. Data cache 180 may be almost any type of cache desired, such as a L1 or L2 cache. In one embodiment, data cache 180 may be configured to associate a secure process descriptor with one or more pages of the cache and may have one or more security flags associated with (all or some subset of the) lines of the data cache 180. For example, a secure process descriptor may be associated with a specific page or pages of data cache 180.

As discussed below, a secure system, such as the system used by device 100 in FIG. 2, may be implemented using various configurations of hardware and software. For the hardware components, one or more conventional CPUs may be used. Alternatively, or in addition, one or more CPUs may be implemented inside a reprogrammable logic block, and an FPGA (field programmable gate array) device may be used therefor. For example, if the device 100 of FIG. 2 were implemented using an FPGA device, in one example, the FPGA device may include the functionality of the component contained within the dashed line 195. In this example, dashed line 195 contains the execution controller 162, the secret keys 104, the hash function block 160, the encryption/decryption block 170, the Instruction cache (I-cache) 110, and the random number generator 182. Other configurations are also possible, including configurations where the entire device 100 is implemented within a reprogrammable hardware block, such that contained within an FPGA.

Generally, embodiments of target device 100 may isolate the working set of a process executing in secure mode stored in data cache 180 such that the data is inaccessible to any other process, even after the original process terminates. More specifically, in one embodiment, the entire working set of a currently executing secure process may be stored in data cache 180 and writes to main memory 190 and write-through of that cache (e.g., to main memory 190) disallowed (e.g., by secured execution controller 162) when executing in secure mode.

Additionally, for any of those lines of data cache 180 that are written to while executing in secure mode (e.g., a "dirty" cache line), those cache lines (or the page that comprises those cache lines) may be associated with a secure process descriptor for the currently executing process. The secure process descriptor may uniquely specify those associated "dirty" cache lines as belonging to the executing secure process, such that access to those cache lines can be restricted to only that process (e.g. be by secured execution controller 162).

In certain embodiments, in the event that the working set for a secure process overflows data cache 180 and portions of data cache 180 that include those dirty lines associated with the security descriptor of the currently executing process need to be written to main memory (e.g., a page swap or page out operation) external data transactions between the processor and the bus (e.g., an external memory bus) may be encrypted (e.g., using encryption block 170 or encryption software executing in secure mode). The encryption (and decryption) of data written to main memory may be controlled by secure execution controller 162.

The key for such an encryption may be the secure process descriptor itself or some derivative thereof and that secure descriptor may itself be encrypted (e.g., using the target device's 100 secret key 104 or some derivative thereof) and stored in the main memory 190 in encrypted form as a part of the data being written to main memory. Note that the one-way hash function block 160 can receive the secret keys 104 via the encryption/decryption block 170 (as shown in FIG. 2), or fed directly from the secret keys block 104. Also, note that the secret keys block 104 includes a plurality of secret keys, including a one-time programmable fixed secret burned in the device, and one or more secret keys that are derivatives of the one-time programmable secret. Thus, the output of the one-way hash function block 160 may get stored back into the set of secret registers.

Instruction cache 110 is typically known as an I-Cache. In some embodiments, a characteristic of portions of this I-Cache 110 is that the data contained within certain blocks be readable only by CPU execution unit 120. In other words, this particular block of I-Cache 130 is execute-only and may not be read from, nor written to, by any executing software. Some portion of this block of I-Cache 130 may also be referred to as the "secured I-Cache" 130. The difference between "secured" I-Cache 130 and "normal" I-Cache 150 may be that the executable code that is stored within the "secured" I-Cache 130 has been verified by the secure execution controller 162 as being un-modified and authorized, by using a digital signature. The manner by which code to be executed is stored in this secured I-Cache block 130 may be by action of the secured execution controller 162 or it may simply be loaded in normally by the standard I-Cache controller logic and then subsequently verified by the secure execution controller 162. Once the executable code located in "secured" I-Cache 130 has been verified, then that executable may be allowed to run in secure mode. Normal I-Cache 150 may be utilized to store code that is to be executed normally as is known in the art.

Additionally, in some embodiments, certain blocks may be used to accelerate the operation of a secure code block. Accordingly, a set of CPU registers 140 may be designated to only be accessible while the CPU 120 is executing secure code or which are cleared upon completion of execution of the secure code block (instructions in the secured I-cache block 130 executing in secured mode), or if, for some reason a jump to any section of code which is located in the non-secure or "normal" I-Cache 150 or other area occurs during the execution of code stored in the secured I-Cache 130.

In one embodiment, CPU execution unit 120 may be configured to track which registers 140 are read from or written to while executing the code stored in secured I-cache block 130 and then automatically clear or disable access to these registers upon exiting the "secured execution" mode. This allows the secured code to quickly and automatically "clean-up" after itself such that only data that is permitted to be shared between two kinds of code blocks is kept intact. Another possibility is that an author of code to be executed in the secured code block 130 can explicitly identify which registers 140 are to be cleared or disabled. In the case where a secure code block is interrupted and then resumed, then these disabled registers may potentially be re-enabled if it can be determined that the secure code that is being resumed has not been tampered with during the time that it was suspended.

In one embodiment, a set of registers 140 which are to be used only when the CPU 120 is executing secured code may be implemented in order to deal with the "leaking" of data stored in registers 140 between secure and non-secure code segments. In one embodiment this may be accomplished utilizing a variation of the register renaming and scoreboarding mechanism, which is practiced in many contemporary CPU designs. In some embodiments, the execution of a code block in secured mode is treated as an atomic action (e.g., it is non-interruptible) which may make this such renaming and scoreboarding easier to implement.

Even though there may seem to be little possibility of the CPU 120 executing a mixture of "secured" code block (code from the secured I-Cache 130) and "unsecured code" (code in another location such as normal I-cache 150 or another location in memory), such a situation may arise in the process of switching contexts such as when jumping into interrupt routines. In this case, the opportunity for secure data "leakage" may depend on where the CPU 120 context is stored (most CPU's store the context in main memory, where it is potentially subject to discovery and manipulation by an unsecured code block).

In order to help protect against this eventuality, in one embodiment another mechanism may be utilized for protecting the results obtained during the execution of a secured code block that is interrupted mid-execution from being exposed to other execution threads within a system. One exemplary mechanism would be to disable stack pushes while the target device 100 is operating in secured execution mode. This disabling of stack pushes will mean that a secured code block is thus not interruptible in the sense that, if the secured code block is interrupted prior to its normal completion, it cannot be resumed and therefore must be restarted from the beginning. It should be noted that in certain embodiments if the "secured execution" mode is disabled during a processor interrupt, then the secured code block may also potentially not be able to be restarted unless the entire calling chain is restarted. In the case where stack pushes of secure-mode data is desired, then this secure data should be encrypted before being written out to main memory. The encryption key for such an operation may be calculated by the secure execution controller 162 in such a manner that the CPU cannot access nor otherwise operate directly on the encryption key.

Each target unit 100 may also have one or more secret keys 104; the values of which are not readable by the CPU. In one embodiment, the first of these keys (the primary secret key) may be organized as a set of secret keys, of which only one is usable at any particular time. If the "ownership" of a unit is changed (for example, the equipment containing the protocol engine is sold or its ownership is otherwise transferred), then the currently active primary secret key may be "cleared" or superseded by a new value. This new value can either be transferred to the unit in a secure manner or it can be already stored in the unit in such a manner that it is only useable when this first key is cleared. In effect, this is equivalent to issuing a new primary secret key to that particular unit when its ownership is changed or if there is some other reason for such a change (such as a compromised key). A secondary secret key may be utilized with the target unit 100 itself. Since the CPU 120 of the target unit 100 cannot ever access the values of either the primary or the secondary secret keys, in some sense, the target unit 100 does not even "know" its own secret keys 104. Thus, these keys may only be stored and used within the secure execution controller 162 of the target unit 100, as will be described.

In another embodiment, the two keys may be constructed as a list of "paired" keys, where one such key is implemented as a one-time-programmable register and the other key in the pair is implemented using a re-writeable register. In this embodiment, the re-writeable register may be initialized to a known value (e.g., zero) and the only option that may be available for the system to execute in secure mode in that state may be to write a value into the re-writeable portion of the register. Once the value in this re-writeable register is initialized with some value (e.g., one that may only be known by the Licensing Authority, for example), then the system may then only be able to execute general purpose code while in secure mode. If this re-writeable value should be re-initialized for some reason, then the use of a new value each time this register is written may provide increased security in the face of potential replay attacks.

Another embodiment may prevent any general purpose code execution (secure or otherwise) on the device until it has correctly completed the secure boot process. Note that this may include a successful completion of a specific Power-On test procedure (or other procedure) in order to verify that the hardware has not been tampered with as well. In this manner, the device may require that the specific Secure Boot process has been correctly completed before it is able to run any executable other than the renewable Secure Boot process itself. Thus, the renewable Secure Boot process becomes the equivalent of a "secure device activation test." Without a successful completion of this test, the device may be prevented from functioning in the more general sense. There are several means by which this general-purpose functional prohibition mechanism may be implemented.

Yet another set of keys may operate as part of a temporary public/private key system (also known as an asymmetric key system or a PKI-based system). The keys in this pair 108 may be generated on the fly and may be used for establishing a secure communications link between similar units, without the intervention of a central server. As the security of such a system is typically lower than that of an equivalent key length symmetric key encryption system, these keys may be larger in size than those of the set of secret keys 104 mentioned above. These keys 108 may be used in conjunction with the value that is present in the on-chip timer block in order to guard against "replay attacks", among other things. Since these keys 108 may be generated on the fly, the manner by which they are generated may be dependent on the random number generation system 182 in order to increase the overall system security.

In one embodiment, one method that can be used to affect a change in "ownership" of a particular target unit is to always use the primary secret key as a compound key in conjunction with another key 107, which we will refer to as a timestamp or timestamp value, as the value of this key may be changed (in other words may have different values at different times), although it may not necessarily reflect the current time of day. This timestamp value itself may or may not be itself architecturally visible (e.g., it may not necessarily be a secret key), but nonetheless it will not be able to be modified unless the target unit 100 is operating in secured execution mode. In such a case, the consistent use of the timestamp value as a component of a compound key whenever the primary secret is used can produce essentially the same effect as if the primary secret key had been switched to a separate value, thus effectively allowing a "change of ownership" of a particular target endpoint unit without having to modify the primary secret key itself.

As may be understood then, target device may use secure execution controller 162 and specific portions of the data cache 180 to isolate the working sets of processes executing in secure mode such that the data is inaccessible to any other process, even after the original process terminates. This working set isolation may be accomplished in certain embodiments by disabling off-chip writes and write-through of data cache when executing in secured mode, associating lines of the data cache written by the executing process with a secure descriptor (that may be uniquely associated with the executing process) and restricting access to those cache lines to only that process using the secure process descriptor. Such a secure process descriptor may be a compound key such as an authorization code or some derivative value thereof.

When it is desired to access data in the data cache by the process the secure descriptor associated with the currently executing process may be compared with the secure descriptor associated with the requested line of the data cache. If the secure descriptors match, the data of that cache line may be provided to the executing process while if the secure descriptors do not match the data may not be provide and another action may be taken.

Moreover, in certain embodiments, in the event that the working set for a secure process overflows the on-chip cache, and portions of cache that include those dirty lines associated with the secure process descriptor need to be written to main memory (e.g., a page swap or page out operation) external data transactions between the processor and the bus (e.g., an external memory bus) may be encrypted. The key for such an encryption may be the secure process descriptor itself or some derivative thereof and that secure process descriptor may be encrypted (e.g., using the target device's secret key or some derivative thereof) prior to being written out to the main memory. Again, this encryption processes may be accomplished substantially using the hashing block of the target device or by use of an software encryption process running in secure mode on the processor itself or some other on-chip processing resource, or by use of a encryption function that is implemented in hardware.

To enhance performance, in certain cases where a secure process may have a large working set or is frequently interrupted (e.g., entailing many page swaps) a subset of the processes working set that is considered "secure" may be created (e.g., only a specific subset of the dirty cache lines for the process may be associated with the secure descriptor) and only encrypt those specific cache lines or the portion of the cache containing those lines, when it is written out to external memory.

Additionally, to enhance performance, an off-chip storage mechanism (e.g., a page swapping module) can be run asynchronously in parallel with an interrupting process (e.g., using a DMA unit with integrated AES encryption hardware acceleration) and thus, could be designed to have a minimal impact on the main processor performance. In another embodiment, a separate secure "working set encapsulation" software module may be used to perform the encryption prior to allowing working set data to be written out to memory.

The following descriptions refer to examples of hard-wired, FPGA (field programmable gate array), and legacy implementations of renewable secure boot systems. Other examples are also possible.

Figure 3:
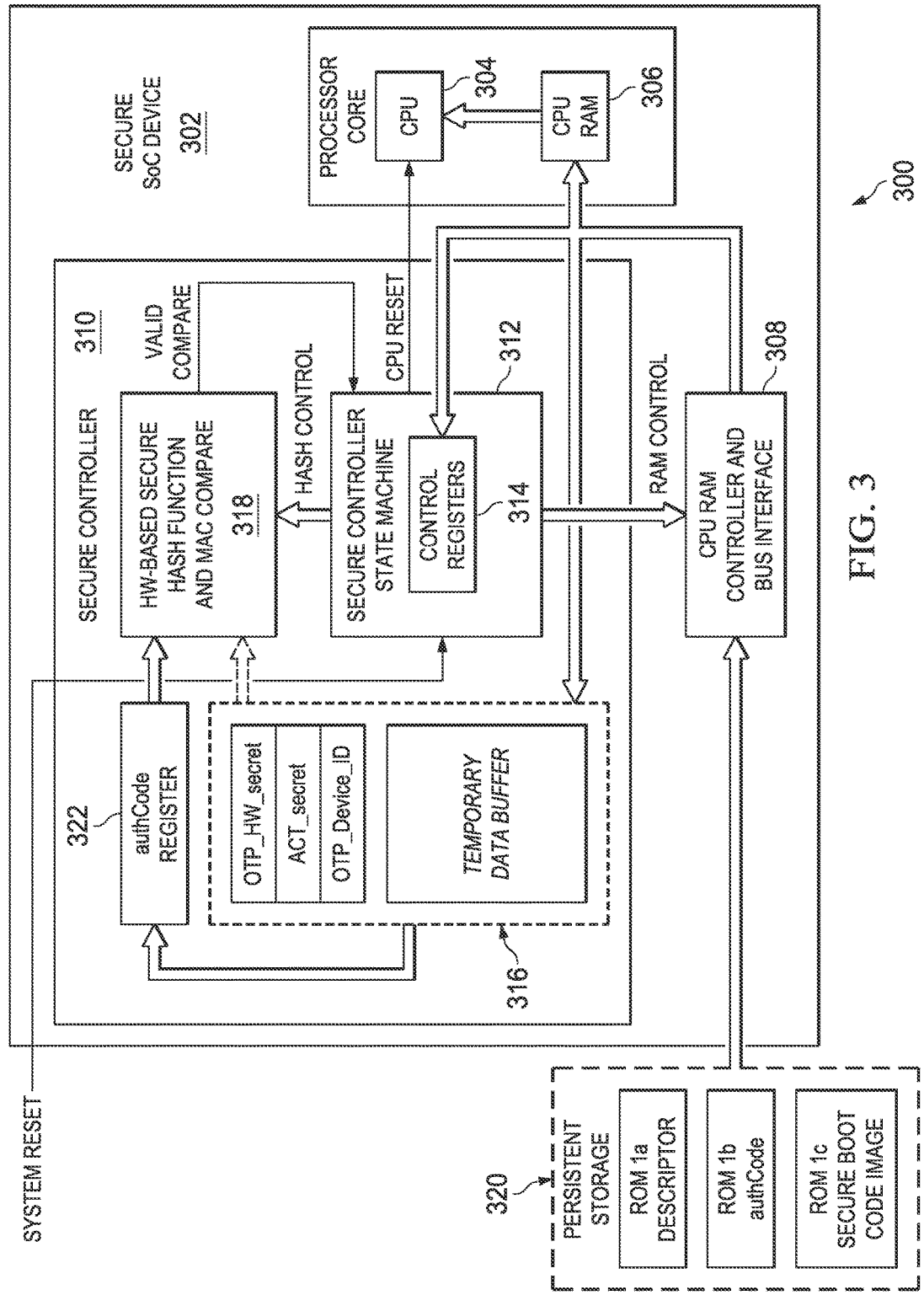
FIG. 3 is a block diagram of one embodiment of a secure system.

FIG. 3 shows an example configuration of an embodiment of a renewable secure boot system 300 that is implemented on a SoC (System-on-Chip) device 302. The SoC device 302 contains a standard CPU Core (including a CPU 304 and an on-chip RAM block 306), a bus interface unit (BIU) and controller 308 that arbitrates access to the CPU RAM 306, and a secure controller 310 that provides the renewable secure boot functionality. This secure controller block 310 includes a state machine 312 that implements the control logic as well as several control registers. These secure controller state machine registers may be implemented in a number of ways, depending on the desired functionality of the state machine and for clarity's sake, they are thus depicted in FIG. 3 as a monolithic "control registers" block 314. One such control register may implement a nonce value that could be retained (i.e., not automatically cleared) across a "warm reboot" cycle.

Also present inside the secure controller block 310 are a number of secure registers 316 including those labeled "OTP_HW_secret", "OTP_Device_ID" and "ACT_secret". These registers can be divided into "secret" and "public" registers. The "secret" registers are not architecturally visible to the CPU (in other words, they do not appear in the CPU's memory space—or that of any external device). These registers are used as inputs to the secure one-way hash function 318 in order to generate the various message authentication codes (MACs) that are used for correct operation of the secure controller. The "public" registers are those whose values may be read by the CPU or by some external device. The nonce register mentioned above is an example of such a "public" register, although its value is read-only and it should not be updated by any entity other than the secure controller hardware itself.

In addition, some of these registers are designated as "One-Time-Programmable" (or OTP). A valid value can only be written to an OTP register once (hence the name). Thereafter, this kind of register cannot be changed and it will hold its value even if there is no power available to the chip. For security, the values stored in the OTP registers may be cleared under some error condition; but after that error, the OTP register is typically no longer usable. OTP registers are programmed (written) either at chip fabrication time or in some other controlled location. An alternate, but functionally equivalent method of implementing a secret OTP register(s) would be to use the output of a Physically Unclonable Function (PUF) block. The advantage of using a PUF block in the place of a more standard OTP register is that the PUF data is typically not recoverable if the device is destructively disassembled nor is its resulting output directly observable if the part is examined using a non-invasive probe, such as an electron-beam tester. Non-OTP registers are typically re-writeable (sometimes only under certain conditions), and they may or may or may not hold their values over power-down or intrusion detection conditions.

Finally, the overall system also includes a persistent storage block 320 that may or may not be located off-chip. This persistent storage block 320 is non-volatile and it is readable (and potentially writable) by anyone.

In this system, asserting the external system reset signal causes the secure controller state machine 312 to initialize the SoC 302 by first asserting the CPU reset and by taking control of the BIU 308 so that no other logical device may access the CPU RAM 306 until the CPU 304 is securely booted. Next, the secure controller 310 loads the secure boot code descriptor (identified as ROM 1a in persistent storage block 320), which consists of a pointer to the secure boot code itself and an indication of the length of the secure boot code block into its control registers. Next, the secure controller state machine 312 loads the secure boot code auth-Code (ROM 1b) into the authCode register 322. Then, the secure controller 312 begins to load the secure boot code (ROM 1c) into the CPU RAM block 306. This code block may be loaded into the RAM in segments, but each code block is loaded into the RAM in its entirety before the CPU is allowed to begin execution. As the code is loaded into the CPU RAM 306, the code is also fed into the HW Hash functional block 318. In addition to the code itself, this Hash block 318 uses the OTP_HW_Secret, Act_Secret and OTP_Device_ID registers mentioned above in the process of evaluating the Hash function. Since at least one of these registers is "secret", then the output (the message authentication code or MAC) of the Hash function 318 is not predictable unless the secret is known.

This set of secret registers (the OTP_HW_secret and the ACT_secret) may be hardware secrets such as described in one or more of: U.S. Pat. No. 7,203,844, issued Apr. 10, 2007, entitled "Recursive Security Protocol System and Method for Digital Copyright Control", U.S. Pat. No. 7,457,968, issued Nov. 25, 2008, entitled "Method and System for a Recursive Security Protocol for Digital Copyright Control", U.S. Pat. No. 7,747,876, issued Jun. 29, 2010, entitled "Method and System for a Recursive Security Protocol for Digital Copyright Control", U.S. Pat. No. 8,438,392, issued May 7, 2013, entitled "Method and System for Control of Code Execution on a General Purpose Computing Device and Control of Code Execution in an Recursive Security Protocol", U.S. Pat. No. 8,726,035, issued May 13, 2014, entitled "Method and System for a Recursive Security Protocol for Digital Copyright Control", U.S. patent application Ser. No. 13/745,236, filed Jan. 18, 2013, entitled "Method and System for a Recursive Security Protocol for Digital Copyright Control", U.S. patent application Ser. No. 13/847,370, filed Mar. 19, 2013, entitled "Method and System for Process Working Set Isolation", and U.S. patent application Ser. No. 14/497,652, filed Sep. 26, 2014, entitled "Systems and Methods for Establishing and Using Distributed Key Servers", and U.S. patent application Ser. No. 14/683,924, filed Apr. 10, 2015, entitled, "System and Method for Sharing Data Securely," which are hereby incorporated by reference in their entireties for all purposes.

In this manner, as the secure boot code block is loaded into the CPU RAM 306, it is checked for integrity as well as for authenticity by comparing the generated MAC with the previously-obtained value that was stored in the authCode register 322. If the two match, then the CPU reset signal is de-asserted and the CPU 304 can begin the booting process. As that secure boot process continues, then the control over access to the CPU RAM block 306 can then be relaxed such that other devices can potentially access the shared RAM through the BIU, as long as at least some portion of the RAM (typically low-level system code) is protected against external modification.

In the system described above, the integrity and authenticity of the boot code is determined by an exact match (or not) between the authCode (which is public) and the internally-generated MAC. The authCode is generated by an external service (generally referred to as a Licensing Authority or LA) based on the OTP_Device_ID and the OTP_HW_Secret and the ACT_Secret, both of which are known by the LA service. The ability to generate a valid authCode is predicated upon knowing the appropriate secrets that are stored on the SoC chip; namely the OTP_HW_Secret and the ACT_Secret. In the case where these are the only secrets that are used in the evaluation of the MAC, then the authCode is considered to be "persistent". In other words, the authCode will be valid for as long as the various secret values are maintained on-chip. If the ACT_secret is stored in a battery-backed static RAM register, this means that if the battery power is removed, then the SoC device must acquire a new value for the ACT_secret before any such authCode can be correctly compared. Of course, the security risk of reusing the same value for such a secret is great. Typically, any time a device requires such an ACT_secret to be written, then good security practice dictates that this secret should never be a repeat of some previously-used value.

This practice of always providing a new value for the ACT_secret register also conveys the renewability aspect to the system. In other words, if an authCode that worked in the past (i.e., it was derived from an old version of the ACT_secret) is used on a system where the ACT_secret has been updated, then the old authCode will no longer work correctly. The only way that such a system can now successfully complete the secure boot process as described above is for it to acquire a new authCode; one that matches the new value of the ACT_secret.

In the case where the desire is to enable a "provisioned" operating mode (i.e., one where the device must always connect to a service in order to perform a secure boot), then there are several means by which this may be accomplished. Perhaps the simplest method, however, is to clear the ACT_secret register as one of the first steps in the secure boot process. This way, the device must always request a new value for the ACT_secret (and thus, a new authCode) from the service prior to any kicking off any secure boot procedure. Note that this kind of operation will normally require some amount of "persistent" capabilities. At the least, the device should always be able to communicate with the service in a manner that will unambiguously identify itself. Otherwise, the service may not be able to correctly (and securely) provision the device with a new ACT_secret value.

Thus, we have described a system that will support a renewable secure boot in either a "persistent" or a "provisioned" mode. Both modes provide for secure boot process updates while the device is deployed in the field and both modes prevent a reversion to a previous version of the secure boot image.

In contrast with other secure boot mechanisms, embodiments of this system can be implemented in a manner that does not require asymmetric cryptography operations. Since the only cryptographic functional requirement for this system is a secure one-way hash function, this kind of secure boot operation can be very efficiently implemented on a relatively low-performance (and thus, simple and low-power) device without causing an unacceptably slow boot-time performance for the system.

Because the renewable secure boot functionality is based on an authCode, if the OTP_secret of the target device is somehow compromised, then this situation will potentially allow the device to appear to be running securely when it is not. However, such an exploit can only compromise the particular target device whose OTP_Secret has been exposed. Any other such device must also be compromised in the same manner (separately) in order for it to also be compromised. In contrast, for a public-private key based signature verification system, compromising the common private key can compromise all such devices whose security are based on the public counterpart of that private key. Thus, the renewable secure boot mechanism described herein is not generally susceptible to the "Break-once-break-everywhere" phenomenon.

Another significant advantage of this system over more typical secure boot mechanisms is that it is not vulnerable to replay attacks. As discussed earlier, in the case where the ACT_secret value has been updated (correctly), then no previous value for the authCode will ever compare correctly again to the internally-generated MAC value. So, there is no way that an attacker can ever reuse a previously-valid authCode once the ACT_secret has been updated to a new value. This is in contrast to systems where a public/private key signing mechanism is used to validate the secure boot code image.

Another option for an embodiment for implementing a renewable Secure boot system is to use a reprogrammable logic device. In this case, the SoC functionality described above with respect to FIG. 3 can be realized using an FPGA (field programmable gate array) device. Additionally, such a system does not require that any portion of the logic design be fixed (including even the HW Hash function). However, there is at least one portion of any such system that must be fixed in silicon (forming the hardware Root-of-Trust) in order to maintain the system's security. In most FPGA designs, this HW Root-of-Trust can be implemented using a fixed decryption block that acts to decrypt an externally stored device configuration bit-file (effectively the logical description of how the device operates). This decryption is typically achieved using a hardware-based symmetric decryption engine (such as AES) with an OTP decryption key that can be programmed by the user but is not architecturally visible to either the outside or to the FPGA fabric.

The verification function of such a system is thus implicit; the encrypted configuration bit-file will only decrypt properly if it has not been tampered with. If the bit-file is not encrypted, then there must be some other means to ensure that the FPGA design is verifiably correct. One manner by which this can be accomplished is to use a "boot-strapped" design that first loads a verification function into the FPGA and then uses that verification function to check the rest of the design as it is loaded in. In that case, the verification portion of the design must either itself be encrypted or it must be able to verify its own design (e.g., using a randomized scan-chain test vector approach) in conjunction with an external reference of some sort (either an online service or via a Public/Private key based signing mechanism).

Figure 4:
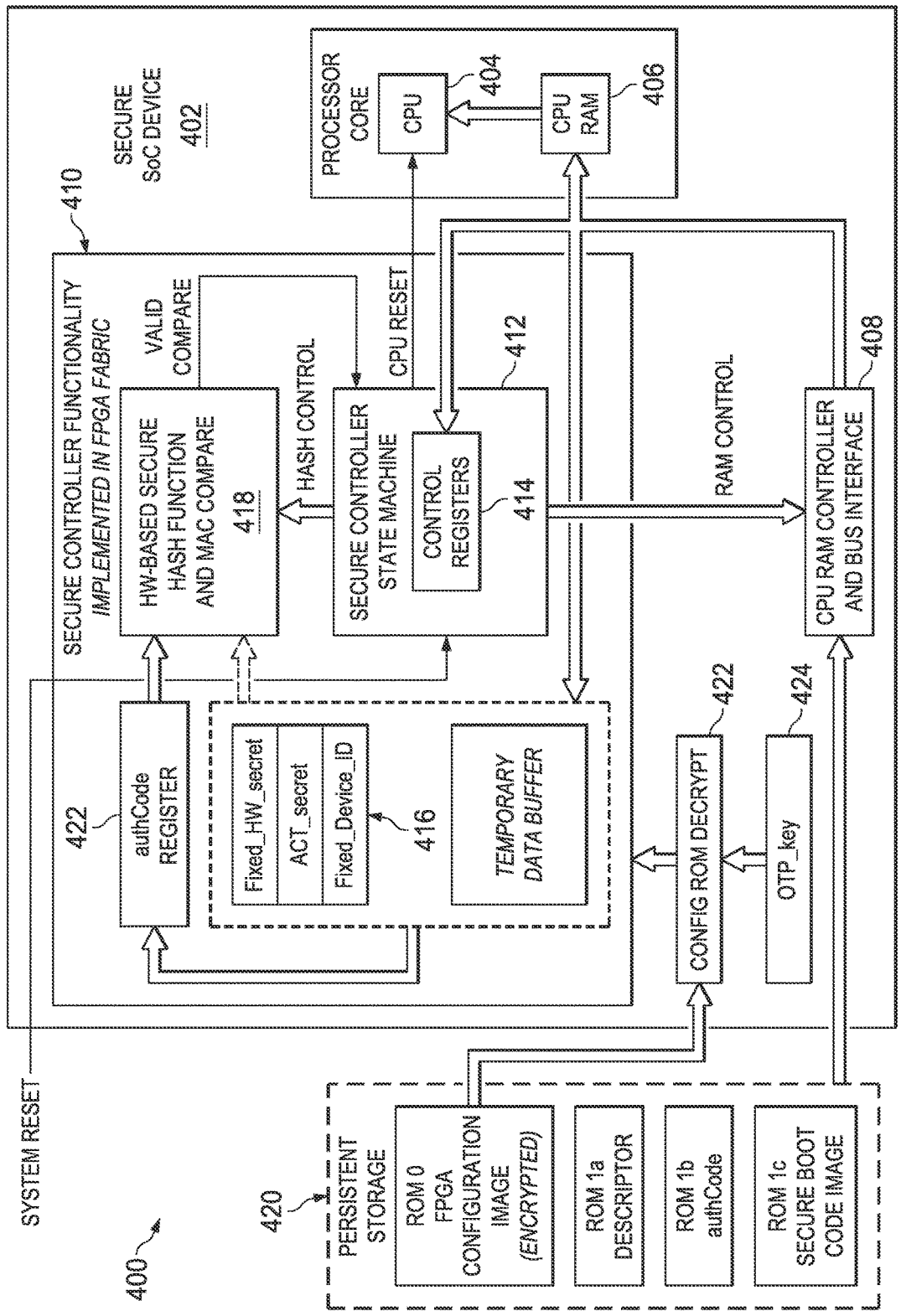
FIG. 4 is a block diagram of one embodiment of a secure system implemented using an FPGA.

FIG. 4 shows a simplified version of one embodiment of a system 400 that is similar to the embodiment illustrated in FIG. 3, but with the system 400 implemented using a standard FPGA fabric. Note that this design does not contain any "OTP" registers. Instead, the "OTP" functionality is replaced by a set of "fixed" registers 416. In operation, these register locations function in the same manner as the OTP registers of the FIG. 3 design, but the values that are stored in these registers are fixed as a part of the configuration bit-file, rather than being programmed at the silicon fab. Additionally, the value of any "secret" OTP registers must either be encrypted in the bit file or they must be replaced after the system is up and running. The replacement values must be able to be encrypted using a key that is derived from an on-chip source of entropy that is not shared with any other piece of the design. The security of this on-chip entropy key encryption procedure can be quite complex to verify, but it can be accomplished using established key-derivation-function (KDF) test methods.

Also note that, in this particular example, the CPU 404 and its associated RAM block 406 are not part of the reprogrammable FPGA fabric, but are realized in a fixed manner (variously referred to as "hard logic" or as a "Hard Processor System" or "HPS"). This method of using a fixed processor design in conjunction with a reprogrammable logic block is quite common in the FPGA market and while it is definitely advantageous to implement the CPU block in this manner from a performance perspective, the overall security of the system described herein does not depend on the HPS being a fixed piece of silicon. The only HW root-of-trust that is required from a security standpoint is the decryption block 422 and the OTP key 424 (or its equivalent, as discussed above).

In operation, the FPGA loads the configuration bit-file from an external flash ROM (the ROM 0 image) when it powers up and (when the bit-file is encrypted) the OTP key 424 is used to decrypt the bit-file as it is read into the FPGA programmable logic fabric. Furthermore, if the OTP key 424 is designed to always be used to decrypt the FPGA configuration bit-file, then a potential attacker cannot even load in a maliciously modified design file.

As mentioned earlier, if the configuration bit-file is encrypted, then in some embodiments, the Fixed_HW secret, is inextricably embedded within this encrypted configuration data bit-file and the OTP_key 424 is used to decrypt it along with the rest of the configuration data. In a similar manner, the encrypted configuration file can also safely incorporate the Fixed_Device_ID and even an initial value for the ACT_Secret register. These registers obviously correspond to the OTP_HW_Secret, OTP_Device_ID and the ACT_Secret registers depicted in FIG. 4.

Thus, if the OTP_key is known, then the Fixed_HW secret value can be determined. Nevertheless, for most FPGA's such an OTP_key is generally considered secure, so the Fixed_HW secret can be assumed to be as secure as the OTP_key. In the case where the FPGA device design is to be updated, then the updated design bit-file should be similarly encrypted using the OTP_key. Thus, if the value of the OTP_key is compromised, then the FPGA device is also compromised. However, if the OTP_key for one device is compromised, then no other FPGA devices should be compromised, since prudent security practice requires that no two FPGA devices share the same OTP_key. It should also be noted that, since the value of the Fixed_HW_secret is stored within the decrypted bit-file, then this update mechanism allows one to renew the value of the Fixed_HW_secret itself.

Once the FPGA fabric is loaded with the decrypted configuration data bit-file, then the system clocks can be started and the secure mode controller 410 implemented in the FPGA fabric can operate in the same manner that was described in the earlier example of FIG. 3. In embodiments of such a system, there may be no functional difference between the FPGA-based implementation (e.g., FIG. 4) and implementations such as those depicted in FIG. 3.

Many existing (legacy) SoC devices that support a secure boot functionality require the processor to enter into "privileged" or "secure" mode directly out of power-up (often referred to as a "Cold-Boot" scenario). This is typically the only method by which such a system can establish a secure Root-of-Trust.

In systems where there is no dedicated secure/normal hardware-based security control, the difference in operation between secure and "normal" code is typically established by segregating the available memory space of "normal" code blocks from that of "secure" code blocks. This can be accomplished by establishing control over the MMU by a secure "hypervisor" or some other single low-level kernel process, such as a security monitor. Thus, the Root-of-Trust in such a system is typically based on the ability to exert control over the memory management unit (MMU). Then, when such a system boots up, the MMU control registers are available to the boot process until the security monitor is up and running, at which point access to these control registers is restricted to the security monitor process.

Once the processor is executing in secure mode, then the processor must trust that the code it is executing is both uncompromised (meaning that it has not been altered in any way) and that it is functionally correct (meaning that its functionality has not been exploited in some unknown malicious manner). In the case where the code itself is responsible for checking to see if it has been compromised, then that situation presents a logical conundrum. The ostensibly secure code has to determine whether it has been manipulated to obscure the fact that it has been manipulated.

Thus, many such systems resort to a staged boot process, where the initial power-up boot mechanism is responsible for only two functions: loading in a subsequent boot stage (which is why this first stage is typically referred to as the Boot Loader) and then checking the signature of the newly-loaded secondary boot stage prior to releasing the processor to execute the second stage boot code. In order to prevent compromise of the Boot Loader, this stage is typically burned into an OTP ROM for the device. However, by burning the Boot Loader into OTP, then this portion of the process is no longer renewable. So, if an exploit is ever found for the Boot Loader, then the device in question is permanently compromised.

In order to prevent the opportunity for any such "permanent" exploits in legacy systems that employ a secure boot process, the most effective strategy is to limit the amount of critical code that must be executed after the reset to an absolute minimum. The smaller the number of potential lines of code that must be executed in this highly vulnerable state, the easier it will be to verify that there are no logical errors or possible exploits in the code. Furthermore, if the "signature checking" feature can be removed from the secure boot code (and offloaded to hardware), then the chances of that there may be an exploitable error in this function is also much lower.

Thus, in a legacy system that already employs an existing secure boot mechanism, the use of a secure controller (used as a secure coprocessor as described in the two examples of FIGS. 3 and 4, described above) can both increase the security of the system as well as offer the option for a renewable secure boot capability to an otherwise non-renewable system.

Figure 5:
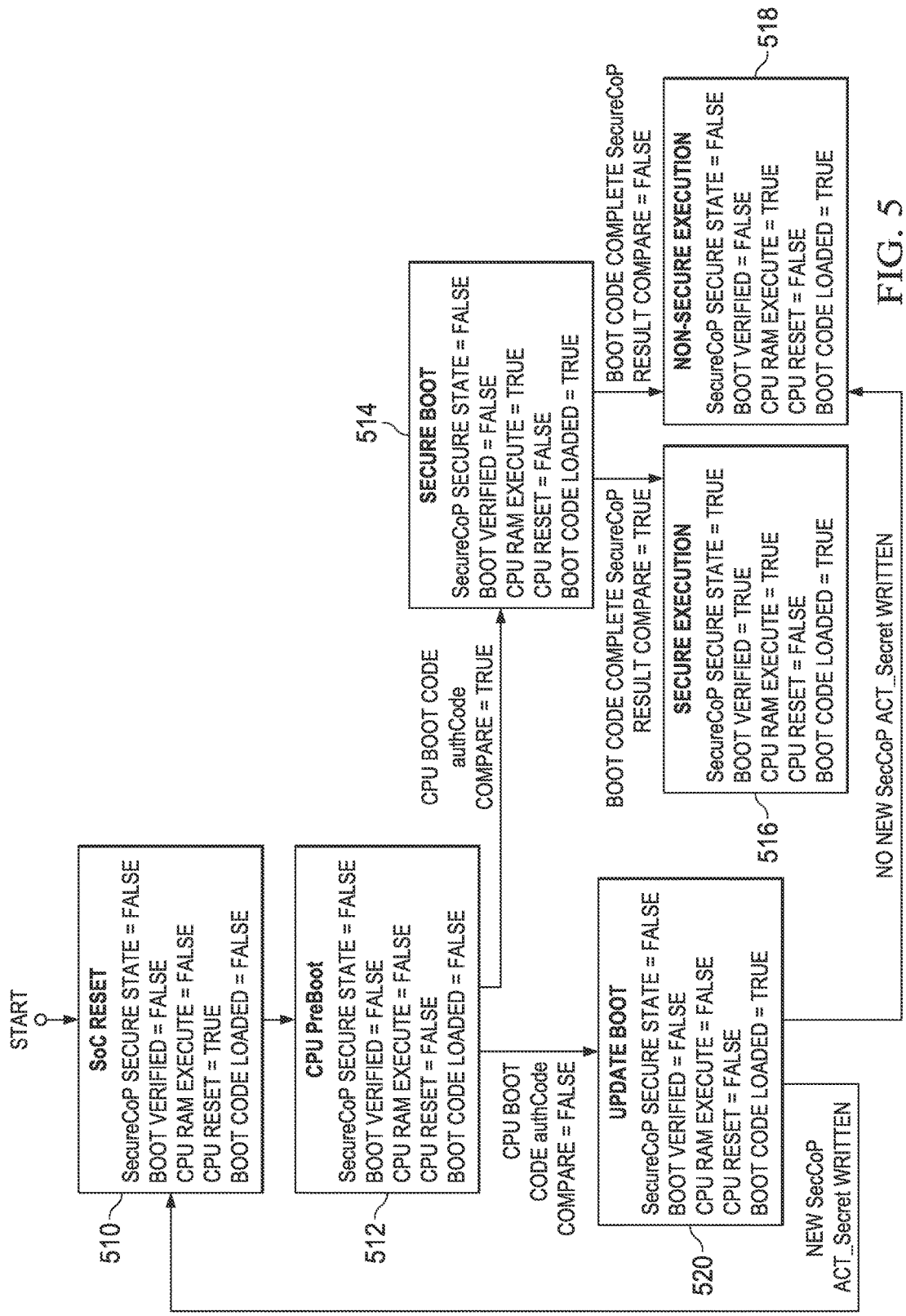
FIG. 5 is a state diagram of one embodiment of a secure system.

The state diagram shown in FIG. 5 illustrates one possible embodiment of a legacy system secure boot process where the secure controller shown in FIG. 3 or FIG. 4 can be used to implement such as renewable secure boot mechanism. For clarity's sake, note that in FIG. 5, the secure controller (or "Secure Co-processor") described above (e.g., secure controller 310, 410) is referenced with a shortened name ("SecureCoP"). In the state diagram of FIG. 5, the initial power-up state "Start" is shown on the top left of the figure.

When the SoC system powers up, the secure controller (SecureCoP) comes out of reset with several internal values in default states. These default values are shown in the "SoC_Reset" box 510 of the sequence diagram. The states of these internal values are shown in FIG. 5 at various stages in the process in the "CPU PreBoot" box 512, the "Secure Boot" box 514, the "Secure Execution" box 516, the "Non-Secure Execution" box 518, and the "Update Boot" box 520. The first thing that the secure controller does after the SoC Reset state is to create a new nonce value (based on the previous nonce value). Following that, the secure controller releases the CPU reset and the system proceeds to the "CPU PreBoot" state 512.

The rest of the steps shown in the state diagram of FIG. 5 (described below) follow as depicted in the state diagram, with the end result being that the system ends up either in the "Secure_Execution" state 516 or in the "Non-Secure_Execution" state 518. Note that if the system ends up in the "Non-Secure" state due to some non-fatal error (for example, if it is not possible to establish communications with the service when required), then the system will, by default end up in the "Non-Secure_Execution" state. At that point, the user always has the option to correct the problem and reset the system to return to the start.

After the Soc Reset state 510, the system goes into a CPU PreBoot state 512, where the secure controller creates a new authCode, based on the SecCoP nonce value. The CPU sets up the SecureCoP control registers, attempts to read the candidate Secure Boot Code into RAM, and signals SecureCoP that the Boot Code Load is complete. The secure controller then compares the Boot Code authCode with an internally-generated MAC, as described above, with respect to FIGS. 3 and 4. If the comparison is false, the process goes to the Update Boot state 520 (described below). If the comparison is true, the process goes to the Secure Boot state 514. At Secure Boot state 514, the CPU executes the verified secure boot code from RAM, sets up the secure monitor, and signals that the secure boot is complete to the nanoHSM. The secure controller then creates a new SecureCoP nonce value and evaluates the SecureCoP secure state to determine if the process should go to Secure Execution state 516 or Non-secure Execution state 518. In the "Non-Secure_Execution" state 518, the security functions are disabled by not having access to any capabilities that would normally be enabled by the secure controller when the system is operating in the "Secure_Execution" state 516. Such capabilities could include the capacity to obtain the keys required to correctly decrypt certain files, for example, or the ability to correctly respond to a security challenge.

If the comparison from the CPU PreBoot state 512 is false, the process goes to the Update Boot state 520. At the Update Boot state 520, the SecureCoP creates a new SecureCoP nonce and clears the ACT_Secret register. The CPU reads the SecureCoP nonce value and signals the service (LA) to request an update. If a communications timeout occurs, the process proceeds to the steps performed by the SecureCoP, described below. Otherwise, the CPU receives and stores updates from the service. The updates include a new CPU Boot Code image, a new CPU Boot authCode, and a new ACT_Secret from the service (in encrypted form). The CPU then writes the encrypted ACT_Secret to the SecureCoP. If the new ACT_Secret register value is not received, the process advances to Non-Secure Execution state 518. If a new ACT_Secret register value is received, the SecureCoP decrypts it and stores it. The SecureCoP then reasserts CPU reset, and returns to the SoC Reset state 510.

Many existing (legacy) non-SoC computing devices (such as Personal Computers or Network servers) that desire to support secure boot functionality include a discrete HW Root-of-Trust that is designed into the device, but not integrated into the CPU. Examples of such HW Roots-of-Trust include Trusted Platform Module chips (TPMs) that are present on many PC motherboards. In order to establish the system's Root-of-Trust, the TPM must be used by the low-level platform software (typically the BIOS) and there are a number of "Platform Configuration Registers" (PCRs) that must be correctly set as a part of the TPM-enabled secure boot process. These PCRs are similar in function to the secure controller configuration registers that were described earlier. In some of these non-SoC legacy systems, the secure boot Code makes use of the TPM as well as special features of the CPU (such as Intel's Trusted Execution Technology) in order to enable the establishment of a system's Root-of-Trust. One of the features of all TPMs is the presence of a unique private key for each device. This key may be used along with a built-in Hash function in order to authenticate the TPM device as well as to verify that a particular piece of software is both authentic as well as unmodified.

However, standard practice does not embed the TPM HW directly in the execution path for the secure boot chain of trust, but rather as a co-processor that can be used by the BIOS or the OS in order to perform security services. This effectively places the security functionality outside of the secure boundary of the system. For such a system, an attacker can bypass the TPM verification and secure storage functionality performing a replay attack on a properly-authorized secure function. For example, if a TPM chip is used to enable a secure file decryption application and the attacker is able to observe the working set data of the secure decryption process, then the decryption key can be "stolen" and thereafter used to decrypt the file in question without requiring that the process be run in secure mode. This same replay attack approach can also be used in order to circumvent standard TPM security functions such as System Attestations. In both cases, the attacks will be successful if the attacker can successfully bypass the low-level system routines that control the MMU. Essentially, a TPM-equipped system is vulnerable as long as the MMU control is vulnerable. Note that successful MMU control does not mean that a given system is secure; it is simply one of the necessary conditions for establishing system security.

Thus, it would seem useful to propose a method by which an add-on secure controller such as has been described above can be used to enhance the security of the system's MMU control registers. However, this can be a difficult thing to accomplish, especially if the system contains a multiplicity of processors, each with its own embedded MMU and each of them containing many control registers— all of which must be correctly initialized in order for the system establish a secure Chain of Trust. Another approach to the problem, however, may be to control the code that may be allowed to access a system's MMU by using the methods described earlier. In this manner, if only a single low-level monitor (essentially a Hypervisor) is allowed to run on a system and the executable code for this Hypervisor is only allowed to be loaded by passing it directly through a secure controller (such as was described earlier), then the system's security can be enhanced. Effectively, this strategy means that the secure controller has then been placed in the execution path (of the Hypervisor at least).

Thus, the renewable secure boot aspects of the systems that are described above can be conveyed to a legacy system where the secure controller is not directly integrated into the CPU execution path. This strategy of loading candidate secure code through the secure controller can also be used in conjunction with a standard TPM-based BIOS secure boot mechanism in order to further increase the security an renewability of other modules of the system (i.e., not just the Hypervisor).

Following are more detailed examples of implementations of systems and methods for a renewable secure boot for a processor. As before, the implementations described are merely exemplary, as numerous other implementations and examples are also possible.

Figure 6:
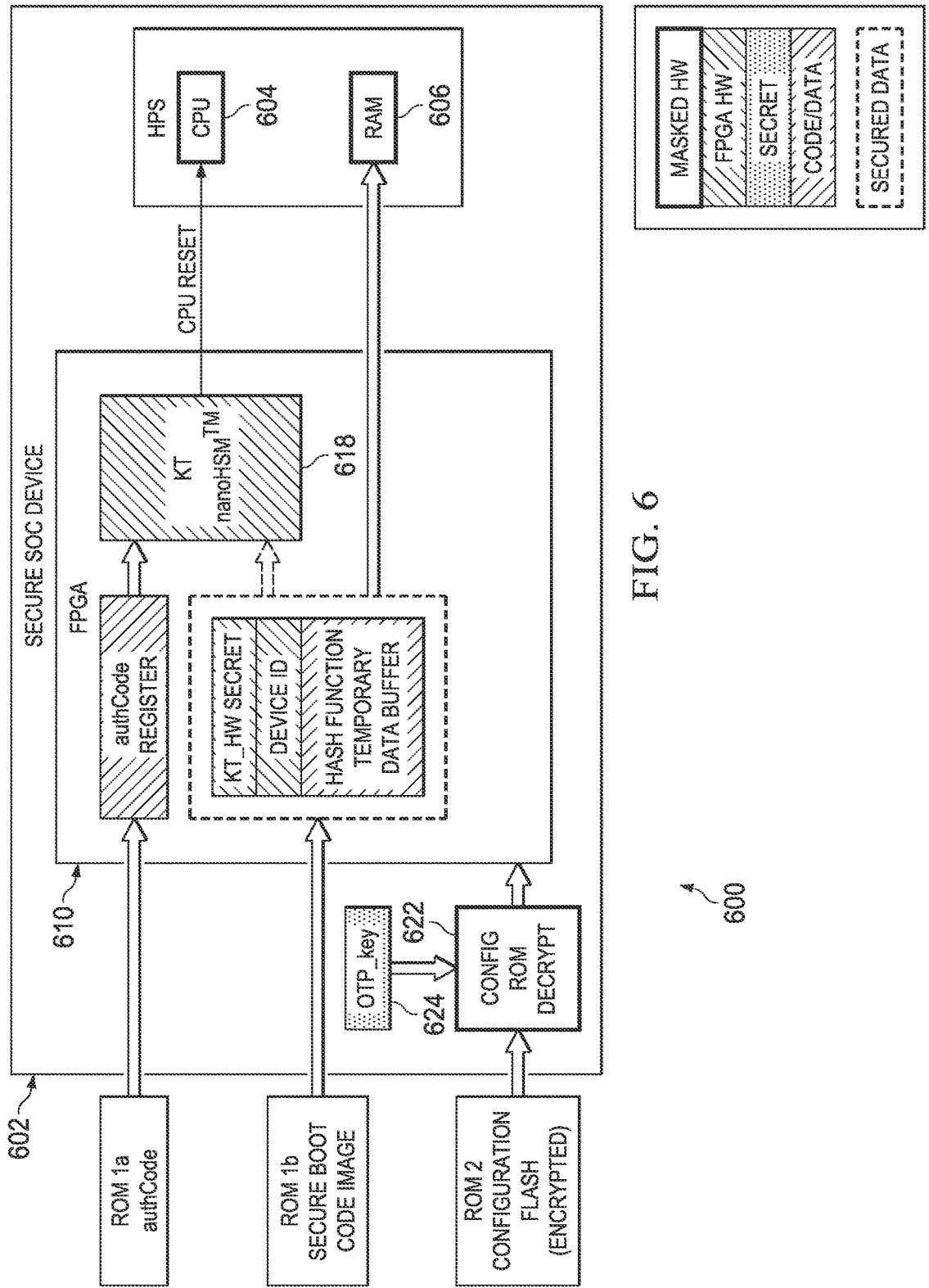
FIG. 6 is a block diagram of one embodiment of a renewable secure boot system using a hardware security module implemented on a SoC device.

FIG. 6 is a block diagram showing an example of an embodiment of a renewable secure boot system 600 implemented on a SoC device 602. The system 600 shown in FIG. 6 is similar to the system 400 shown in FIG. 4. The system 600 includes a Hard Processor System (HPS) having a CPU 604 and HPS on-chip RAM 406. Implemented using a standard FPGA fabric is a hardware security module (HSM), labeled "KT nanoHSM", whose function, generally, is to authenticate and verify a boot code image, pre-load the HPS on-chip RAM 606 with a verified secure boot image, and release the HPS CPU reset.

Also note that, similar to the examples of FIG. 4, the HPS CPU 604 and its associated RAM 606 are not part of the reprogrammable FPGA fabric 610, but are realized in a fixed manner (thus, referred to as a "Hard Processor System" or "HPS"). In one example, the CPU 604, RAM 606, and decryption block 622 are implemented in masked hardware and the HSM 618 and registers are implemented in the FPGA hardware. The OTP_key 624 is maintained as a secret permanently burned into the FPGA hardware.

In operation, the FPGA 610 loads the encrypted FPGA configuration bit-file from an external flash ROM (the "ROM 2" image) when it powers up and (when the bit-file is encrypted) the OTP key 624 is used by the decryption block 622 to decrypt the bit-stream as it is read into the FPGA programmable logic fabric 610. Note that, if the OTP key 624 is designed to always be used to decrypt the FPGA configuration bit-file, then a potential attacker cannot load in a maliciously modified design file.

Once the FPGA fabric 610 is loaded with the decrypted configuration data bit-file from ROM 2, then the system clocks can be started and the hardware security module 618 implemented in the FPGA fabric 610 can operate in a manner similar to that described above with respect to the secure controller of FIG. 3. A detailed walk-through of the process of authenticating and loading a secure boot code image is described below.

Figure 7:
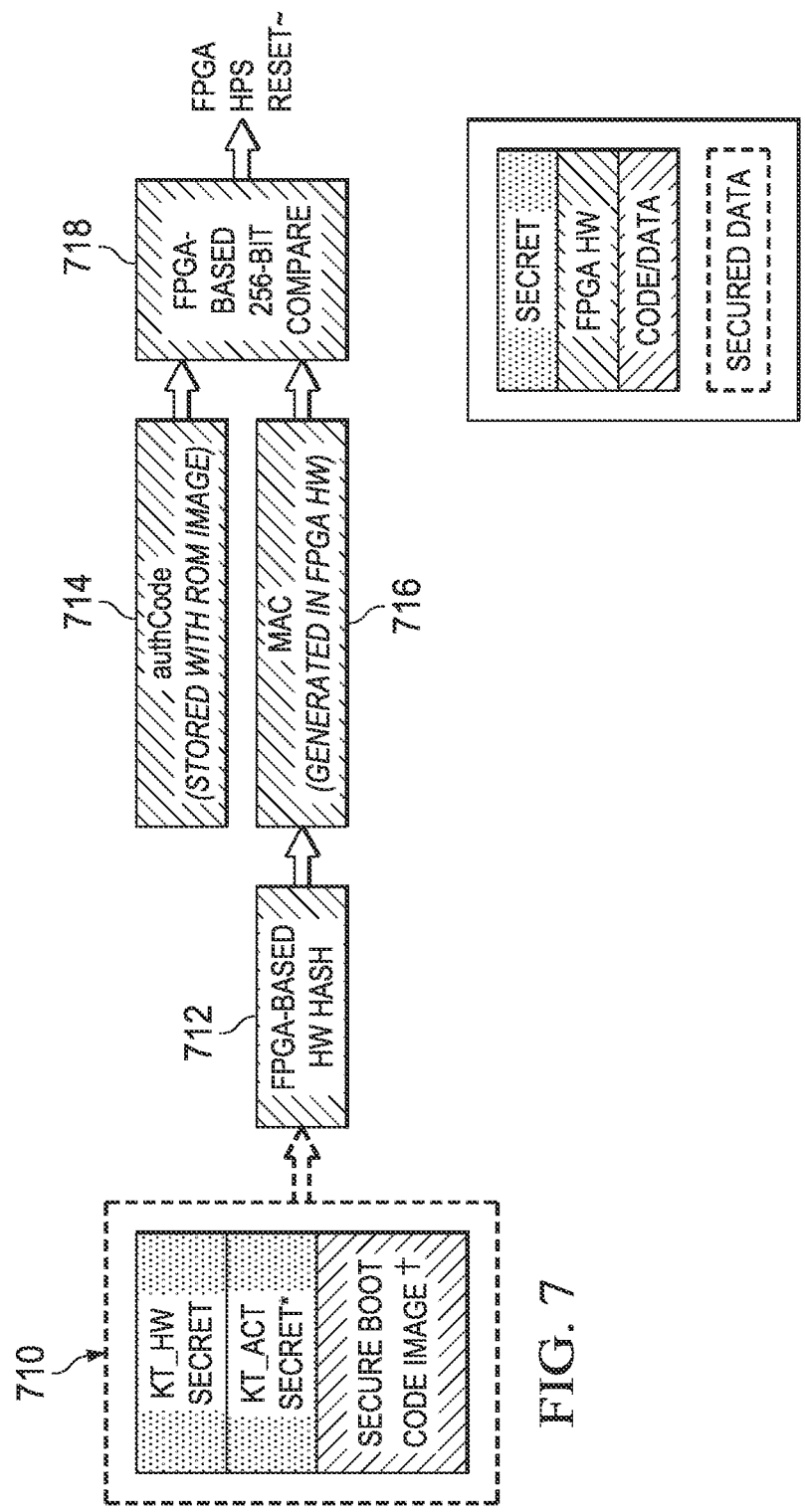
FIG. 7 is a functional block diagram illustrating a root-of-trust example in a secure system implemented using an FPGA.

FIG. 7 is a functional block diagram illustrating a KT_HW root-of-trust. In this example, assume that a KT_HW secret is embedded securely in the FPGA configuration ROM (e.g., ROM 2 of FIG. 6). The known FPGA OTP decryption key is the known KT_HW secret. In this example, the OTP decryption key is provisioned at the factory. The secure boot code, KT_HW, and KT_ACT (an activation secret precursor, which may only be needed for field-upgradeable systems) are managed by the customer. Block 710 represents a set of registers storing the KT_HW secret, the KT_ACT activation secret, and the secure boot code image, which may be sourced externally, if code secrecy is not required.

The KT_HW secret, the KT_ACT activation secret, and the secure boot code image, are hashed by the FPGA-based hardware hash block 712 to generate MAC 716. A publically available authCode 714 (which may be stored with the ROM image) is then compared with the MAC at block 718 to verify the secure boot code image.

As described above, a system may use permanent or provisioned authorization, as desired. Referring to the "root-of-trust" block diagram of FIG. 7, for permanent authorization, the authCode may be based on fixed values. The KT_HW secret and Device ID (a device ID may be used in place of the activation secret shown in FIG. 7) both can be located in the FPGA configuration file. The Device ID can be public, if desired. For provisioned authorization, the authCode can be based on a fixed value, plus a value supplied by a third party (e.g., a licensing authority service, etc.). Devices with provisioned authorizations can be remotely upgraded in the field, as desired. Note that replay attacks may be possible, if provisioned secret values (e.g., KT_ACT) are archived off-chip. However, there is no way to transmute a provisioned authCode into a permanent authCode, since the authcode is a only a derivative of a hardware secret. Also, note that while FIG. 7 was described in the context of verifying a secure boot code image (see block 710), the same concepts apply to any protected code/data.

Figure 8A:
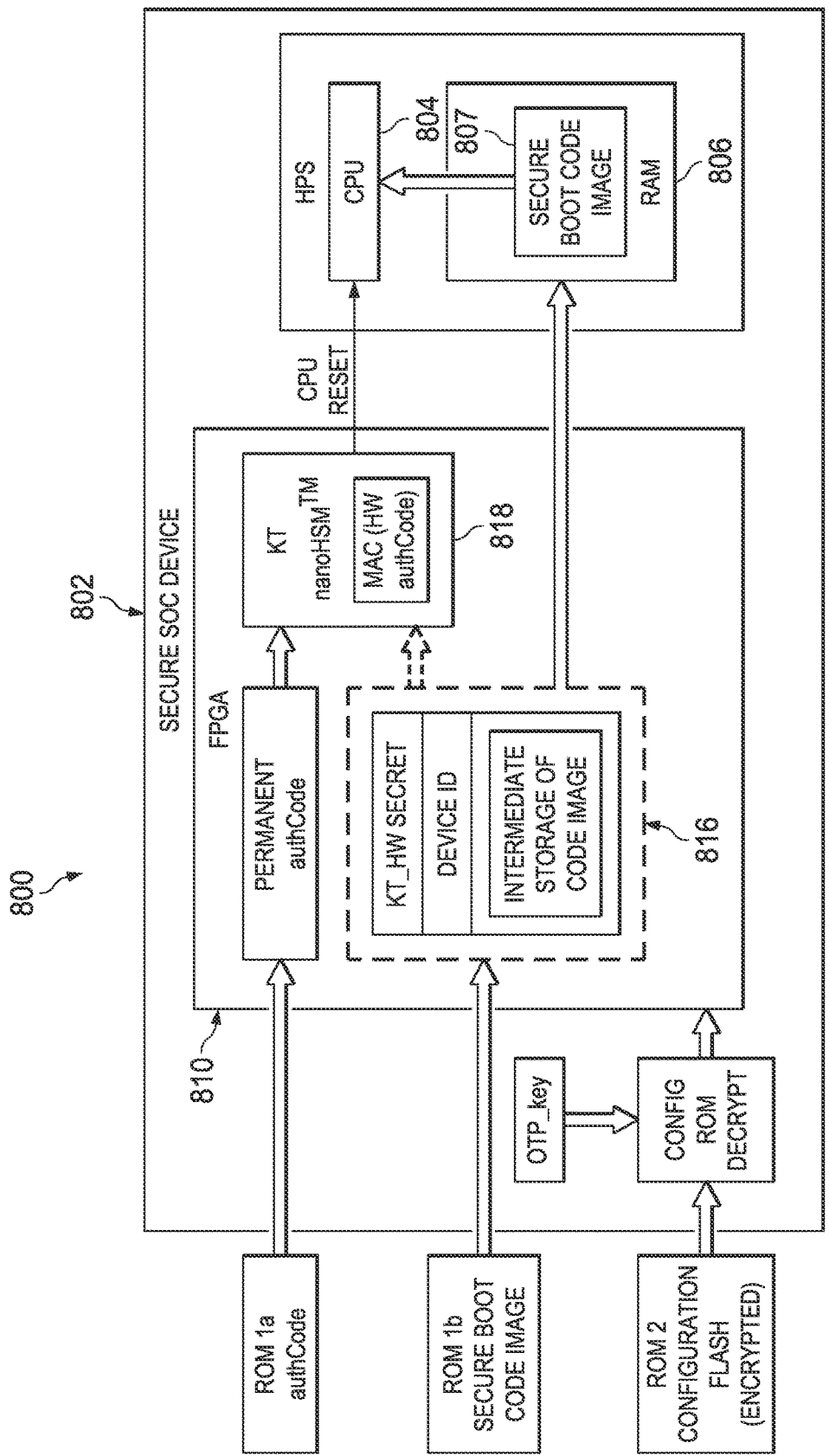
FIGS. 8A-8D illustrate a walk-through of one embodiment of a process for authenticating and loading a secure boot code image in a secure system.
Figure 8B:
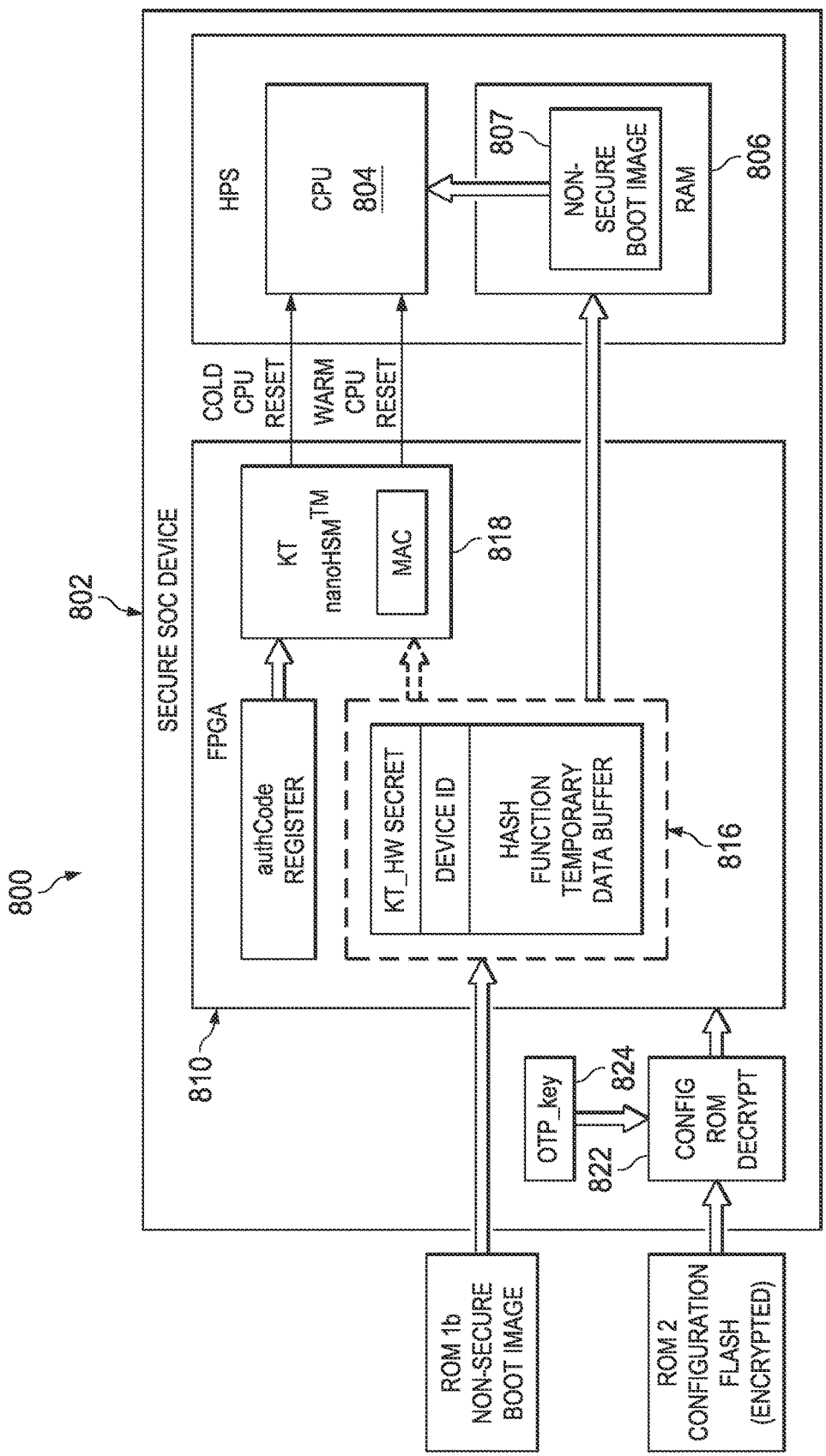
Figure 8C:
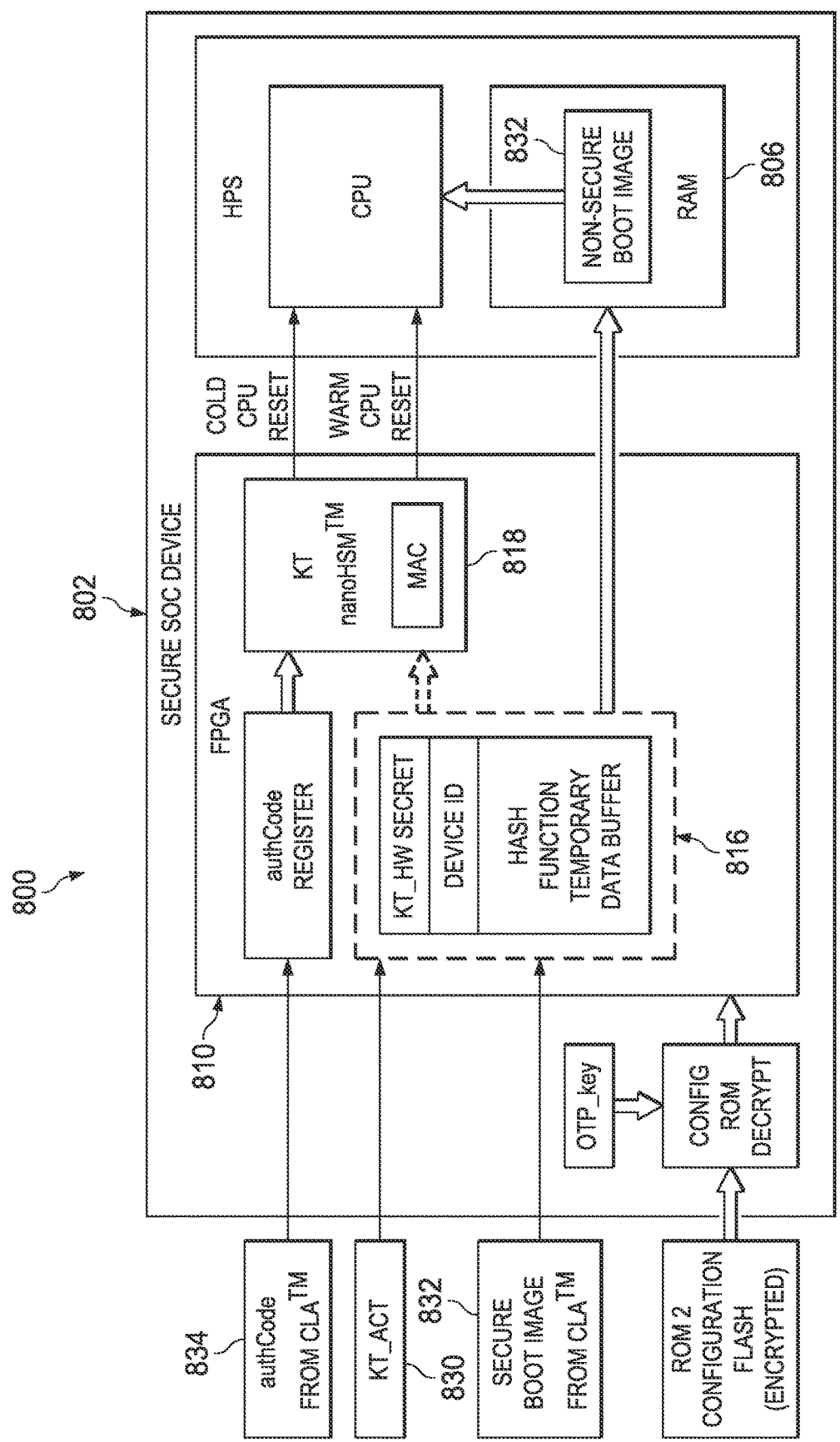
Figure 8D:
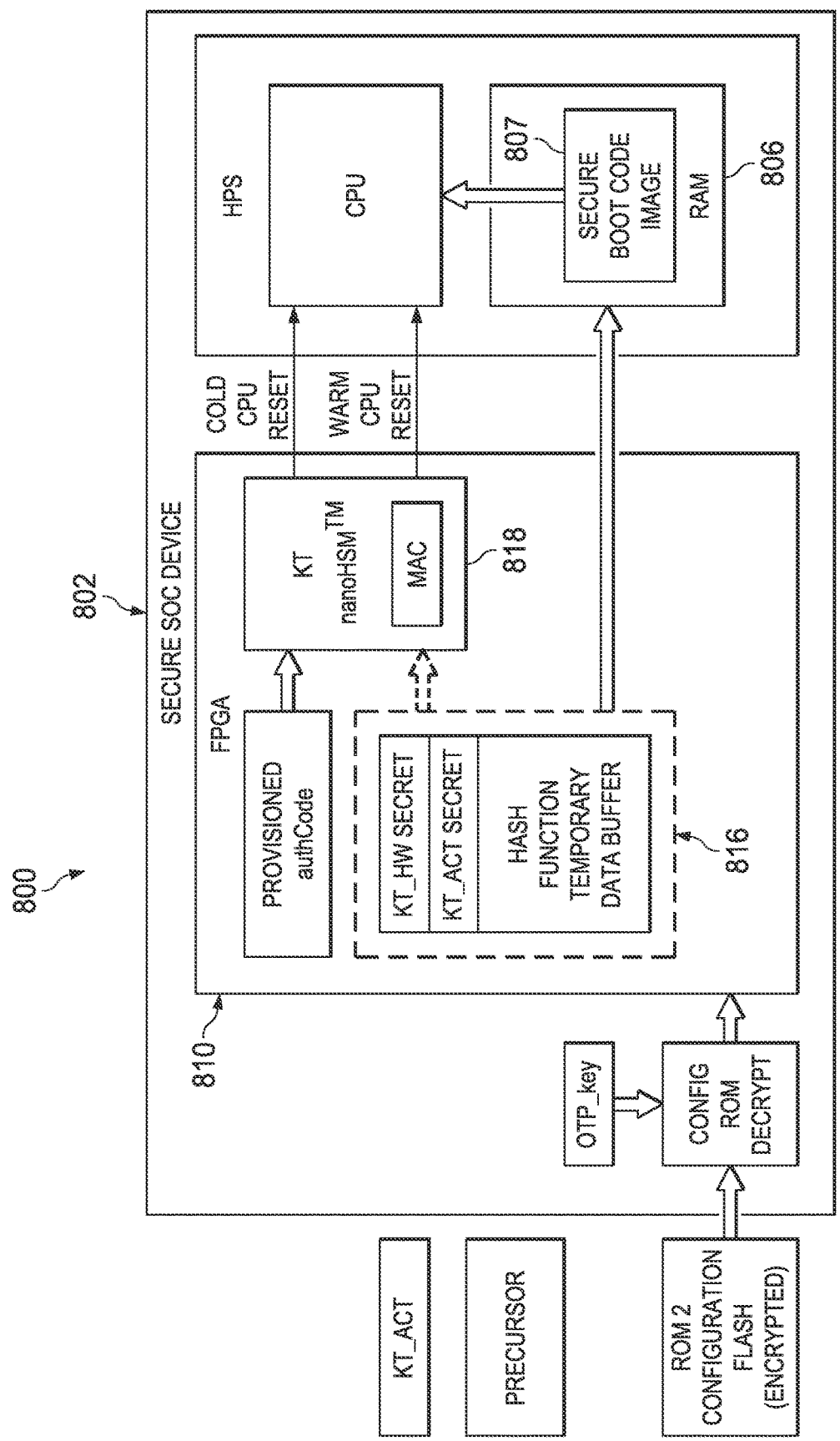

A detailed walk-through of the process of authenticating and loading a secure boot code image is described below and shown in FIGS. 8A-8D. As described above, a renewable secure boot system can use a permanent or provisioned authorization scheme. FIG. 8A shows a process using a permanent authorization scheme. FIGS. 8B-8D show a process using a provisioned authorization scheme.

As with examples described above, the examples shown in FIGS. 8A-8D show a system 800 using a secure SOC device 802. The system 800 shown in FIGS. 8A-8D is similar to the system 600 shown in FIG. 6. The system 800 includes an HPS having a CPU 804 and HPS on-chip RAM 806. A hardware security module (HSM) 818, labeled "KT nanoHSM", is Implemented using a standard FPGA fabric 810. The function, generally, of the HSM 818 is to authenticate and verify a boot code image (ROM 1b), pre-load the HPS on-chip RAM 806 with a verified secure boot image, and release the HPS CPU reset. Note that the system could be implemented in a similar manner using a standard processor(s) instead of the FPGA fabric, as desired.

FIG. 8A shows the startup process in an example using permanent authorization. At power-up, the FPGA 810 loads the KT_HW secret and the Device ID into secure registers 816. The permanent authCode is loaded from ROM 1a into the authCode register. The secure boot code image 807 is fed into the hash function, and is temporarily stored in the data buffer, until it is ultimately loaded into the HPS RAM 806. The system checks the boot code signature as it loads. If the generated authCode is correct, the system knows that the boot code has not been tampered with, and that it is authorized to run on the respective device. If the generated authCode (MAC) is correct, the HSM 818 releases the CPU reset signal (for example, see state 510 in FIG. 5).

FIGS. 8B-8D show an exemplary startup process for a provisioned example. As shown in FIG. 8B, the secure SoC device 802 powers up and initializes the FPGA 810, and boots the non-secure boot image 807 (received from ROM 1b) stored in RAM 806. At this time, the CPU 804 requests provisioning from the licensing authority, using the KT_HW secret for authentication.

As shown in FIG. 8C, the licensing authority responds with the KT_ACT activation secret precursor 830, the secure boot image 832, and the authCode 834. Next, the HSM 818 initiates the secure boot process, including calculating the KT_ACT secret by hashing the KT_ACT precursor 830 received from the licensing authority and storing the resulting KT_ACT secret in the register 816 (as shown in FIG. 8D). Next, the authCode from the licensing authority is loaded into the authCode register, where is made available to the HSM 818 (shown as "Provisioned authCode" in FIG. 8D). Next, the boot image 832 from the licensing authority is intermediately stored in the temporary data buffer, and then loaded into HPS RAM 806 (shown in FIG. 8D as Secure Boot code image 807). The HSM 818 then compares the calculated and provisioned authCodes, and if correct, asserts the warm CPU reset signal. FIG. 8D (referenced above) is a view showing the Provisioned authCode stored in the authCode register, the KT_ACT secret stored in the register 816, and the Secure Boot code image 807 stored in HPS RAM 806.

Additional aspects, explanations and examples are described in the below listed patents and patent applications, which are incorporated herein in their entirety. Further, details of recursive security protocols that may be used in conjunction with the teachings herein are described in U.S. Pat. No. 7,203,844, issued Apr. 10, 2007, entitled "Recursive Security Protocol System and Method for Digital Copyright Control", U.S. Pat. No. 7,457,968, issued Nov. 25, 2008, entitled "Method and System for a Recursive Security Protocol for Digital Copyright Control", U.S. Pat. No. 7,747,876, issued Jun. 29, 2010, entitled "Method and System for a Recursive Security Protocol for Digital Copyright Control", U.S. Pat. No. 8,438,392, issued May 7, 2013, entitled "Method and System for Control of Code Execution on a General Purpose Computing Device and Control of Code Execution in an Recursive Security Protocol", U.S. Pat. No. 8,726,035, issued May 13, 2014, entitled "Method and System for a Recursive Security Protocol for Digital Copyright Control", U.S. patent application Ser. No. 13/745, 236, filed Jan. 18, 2013, entitled "Method and System for a Recursive Security Protocol for Digital Copyright Control", U.S. patent application Ser. No. 13/847,370, filed Mar. 19, 2013, entitled "Method and System for Process Working Set Isolation", and U.S. patent application Ser. No. 14/497,652, filed Sep. 26, 2014, entitled "Systems and Methods for Establishing and Using Distributed Key Servers", and U.S. patent application Ser. No. 14/683,924, filed Apr. 10, 2015, entitled, "System and Method for Sharing Data Securely," U.S. Patent Publication 2015/0089231, filed Sep. 26, 2014, entitled, "Systems and Methods for Establishing and Using Distributed Key Servers", and U.S. patent application Ser. No. 14/683,988, filed Apr. 10, 2015, entitled "System and Method for an Efficient Authentication and Key Exchange Protocol", and are hereby incorporated by reference in their entireties for all purposes.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A method of securely booting a local device comprising:
   the local device receiving an authorization code from a third party;
   the local device receiving an encrypted boot image from the third party;
   the local device decrypting the encrypted boot image using a first key derived from an embedded secret of the local device;
   the local device generating a message authentication code (MAC) using the decrypted boot image and the first key derived from the embedded secret of the local device;
   comparing the authorization code received from the third party with the generated MAC;
   if the generated MAC matches the authorization code received from the third party, using the decrypted boot image to securely boot the local device;
   the local device receiving a second authorization code from the third party;
   the local device receiving a second encrypted boot image from the third party; and
   the local device decrypting the second encrypted boot image using a second key derived from the embedded secret of the local device, wherein the second key is different from the first key.

2. The method of claim 1, further comprising the local device receiving an activation precursor from a third party.

3. The method of claim 2, further comprising generating an activation secret that is derived from the activation precursor and the embedded secret of the local device.

4. The method of claim 1, wherein the local device is implemented using a field programmable gate array (FPGA) device.

5. The method of claim 4, further comprising receiving an encrypted FPGA configuration file from the third party.

6. The method of claim 1, wherein the local device decrypts the encrypted boot image using asymmetric cryptography.

7. The method of claim 1, wherein the third party is a licensing authority.

8. A renewable secure boot system comprising:
   a processor;
   a secure controller; and
   at least one non-transitory computer-readable storage medium storing computer instructions translatable by the processor to perform:
   the secure controller receiving and storing an authorization code from a third party;
   the secure controller receiving an encrypted boot image from the third party;
   the secure controller decrypting the encrypted boot image using a first key derived from an embedded secret of the secure controller;
   the secure controller using a hashing function to generate a message authentication code (MAC) using the decrypted boot image and the first key derived from the embedded secret of the secure controller;
   comparing the authorization code received from the third party with the generated MAC;
   if the generated MAC matches the authorization code received from the third party, using the decrypted boot image to securely boot the device;
   the secure controller receiving a second authorization code from the third party;
   the secure controller receiving a second encrypted boot image from the third party; and
   the secure controller decrypting the second encrypted boot image using a second key derived from the embedded secret of the local device, wherein the second key is different from the first key.

9. The renewable secure boot system of claim 8, further comprising the secure controller receiving an activation precursor from the third party.

10. The renewable secure boot system of claim 9, further comprising generating an activation secret that is derived from the activation precursor and the embedded secret of the secure controller.

11. The renewable secure boot system of claim 8, wherein the secure controller is implemented using a field programmable gate array (FPGA) device.

12. The renewable secure boot system of claim 11, further comprising receiving an encrypted FPGA configuration file from the third party.

13. The renewable secure boot system of claim 8, wherein the secure controller decrypts the encrypted boot image using asymmetric cryptography.

14. The renewable secure boot system of claim 8, wherein the third party is a licensing authority.

15. A computer program product comprising at least one non-transitory computer-readable storage medium storing computer instructions translatable by one or more processors to perform:

receiving an authorization code from a third party and storing the received authorization code at a local device;

receiving an encrypted boot image from the third party, wherein the encrypted boot image is encrypted using a first key derived from an embedded secret of the local device;

decrypting the encrypted boot image using the first key derived from the embedded secret of the local device;

generating a message authentication code (MAC) using the decrypted boot image and the first key derived from the embedded secret of the local device;

comparing the authorization code received from the third party with the generated MAC;

if the generated MAC matches the authorization code received from the third party, using the decrypted boot image to securely boot the local device;

receiving a second authorization code from the third party;

receiving a second encrypted boot image from the third party; and decrypting the second encrypted boot image using a second key derived from the embedded secret of the local device, wherein the second key is different from the first key.

16. The computer program product of claim 15, further comprising receiving an activation precursor from a third party.

17. The computer program product of claim 16, further comprising generating an activation secret that is derived from the activation precursor and the embedded secret of the local device.

18. The computer program product of claim 15, wherein the local device is implemented using a field programmable gate array (FPGA) device.

19. The computer program product of claim 18, further comprising receiving an encrypted FPGA configuration file from the third party.

20. The computer program product of claim 15, wherein the third party is a licensing authority.

* * * * *